United States Patent [19]

Thompson et al.

[11] Patent Number: 4,460,043

[45] Date of Patent: Jul. 17, 1984

[54] METHOD OF ENHANCING OIL RECOVERY BY USE OF EXOPOLYMER PRODUCING MICROORGANISMS

[75] Inventors: Bradley G. Thompson; Thomas R. Jack, both of Calgary, Canada

[73] Assignee: NOVA/Husky Research Corporation Ltd., Alberta, Canada

[21] Appl. No.: 405,371

[22] Filed: Aug. 5, 1982

[51] Int. Cl.$^3$ .............................................. E21B 43/22
[52] U.S. Cl. ..................... 166/246; 166/273; 166/274
[58] Field of Search ............... 166/246, 273, 274, 270; 435/859, 101, 885, 832, 853, 262, 281, 104; 252/8.55 D

[56] References Cited

U.S. PATENT DOCUMENTS

| | | | |
|---|---|---|---|
| 2,807,570 | 9/1957 | Updegraff | 435/281 X |
| 3,326,286 | 6/1967 | Harvey . | |
| 3,340,930 | 9/1967 | Hitzman | 166/246 |
| 3,598,181 | 8/1971 | Wegner et al. | 166/246 |
| 3,650,326 | 3/1972 | Hitzman | 166/246 |
| 3,655,512 | 4/1972 | Tanaka . | |
| 3,965,985 | 6/1976 | Hitzman | 166/275 |
| 4,096,073 | 6/1978 | Hitzman | 166/273 X |
| 4,119,546 | 10/1978 | Wernau | 166/246 X |
| 4,128,482 | 12/1978 | Knight | 166/246 X |
| 4,352,741 | 10/1982 | Wernau | 166/246 X |

FOREIGN PATENT DOCUMENTS

| | | | |
|---|---|---|---|
| 1079947 | 6/1980 | Canada | 166/246 |
| 1085600 | 9/1980 | Canada | 166/246 |
| 1119794 | 3/1982 | Canada | 166/246 |
| 0140067 | 2/1980 | German Democratic Rep. | 166/246 |
| 0089580 | 11/1958 | Netherlands . | |

*Primary Examiner*—Stephen J. Novosad

[57] ABSTRACT

A method of controlling and selectively reducing the permeability of zones in an oil-bearing underground formation which have higher permeabilities than the surrounding zones by injection of exopolymer producing microorganisms into the oil-bearing formation is described. The exopolymer production of the microorganisms used in the method is controlled by regulation of the availability to the microorganisms of a compound such as sucrose which triggers exopolymer production.

17 Claims, 3 Drawing Figures

▲ POLYMER 'OFF' (MEDIUM CONTAINS GLUCOSE AND FRUCTOSE)
● POLYMER 'ON' (MEDIUM CONTAINS SUCROSE)

METHOD OF ENHANCING OIL RECOVERY BY USE OF EXOPOLYMER PRODUCING MICROORGANISMS

The invention relates to the enhanced recovery of mineral oil from underground oil reservoirs, more particularly to a method of controlling and selectively reducing the permeability of zones in an oil-bearing underground formation which have higher permeabilities than the surrounding zones by use of exopolymer producing bacteria.

In the recovery of oil from oil-bearing reservoirs, it is often possible to recover only a portion of the oil contained in the underground formation by the so-called primary recovery methods which utilize the natural forces present in the reservoir. Thus a variety of enhanced recovery techniques, so-called secondary or tertiary recovery, have been employed in order to increase the recovery of oil from subterranean reservoirs.

In one form of the enhanced recovery of oil, a drive fluid is injected under pressure into the oil reservoir through one or more injection wells to maintain, restore or produce formation pressure. The most widely used drive fluid is water however more complex aqueous systems, solvents and gases are also useful as drive fluids. The drive fluid is frequently introduced into the oil-bearing underground formation near the bottom of the formation at or above formation pressure, to displace oil in the reservoir. As the fluid moves through the reservoir, it drives or flushes the oil through the formation. An increased oil saturation develops ahead of the moving fluid and finally reached the production well or wells.

Generally, an oil-bearing underground formation will consist of various regions having different permeabilities. Drive fluid moving through the reservoir preferentially moves to and through regions of higher permeability, fractures and the like. In this way channels tend to form. This phenomenon is generally called channelling or fingering. Drive fluids will pass predominantly through such channels bypassing regions of lower permeability and, thus, bypassing oil contained in such lower permeability regions. This obviously reduces the sweep efficiency of the displacing medium.

It has been suggested that certain types of bacteria which produce extra-cellular slime and/or biopolymers and which grow and reproduce under the conditions found in oil reservoirs are effective in reducing the permeability of underground formations. In many cases such actively slime and/or biopolymer producing bacteria present a problem on injection into the well in that they tend to plug the supply pipes, the walls of the well bore, etc. Furthermore, injection of such bacteria into a reservoir tends to reduce the permeability of higher as well as lower permeability zones in the reservoir unless the bacteria can be accumulated predominantly in the higher permeability zones before the bacterial cells form sufficient slime or biopolymer to considerably lower the permeability of the reservoir area.

In order to minimize plugging on injection as well as indiscriminate reduction of the permeability of the oil-bearing formation, the slime and/or biopolymer formation by the microorganisms has to be controllable before and particularly during and after injection until the microorganisms are moved to the regions the permeability of which has to be reduced.

In the following the term "slime" is used for extra-cellular excretions of microorganisms. The excretions comprise polymeric material which are associated with the cell surface.

The term "biopolymer" is used for constituents of slime which can be totally dissociated from the cells. The term "exopolymer" is used to designate extra-cellularly formed biopolymers as well as slime.

Selective experiments have led to the discovery and isolation of several strains of exopolymer-producing obligate or facultative anaerobic microorganisms in which the exopolymer production can be controlled. The microorganisms used in the method according to the invention are isolated from field samples which may be taken from sources such as oil field waters, marine muds, compost, anaerobic pulp mill sludges, etc. The microorganisms are selected for their ability to produce exopolymers in the presence of a "trigger compound," which triggers exopolymer production in the respective microorganism, while producing little or no exopolymers in the absence of the trigger compound. In microorganisms so selected the production of exopolymer can be controlled.

Exopolymer production is substantially suppressed by keeping the bacterial culture free of the trigger compound and is triggered by adding the trigger compound to the microorganism culture. The microorganisms are further screened for their ability to grow and, when the trigger compound is present, to produce exopolymers under the conditions found in oil reservoirs, particularly in reservoirs containing heavy oil. The recovery of heavy oil generally requires enhanced recovery techniques such as water flooding of the reservoir and, channelling occurs more frequently in the recovery of heavy oils than in the recovery of other types of oil. Moreover, heavy oil in most cases occurs in shallow formations so that the temperatures and pressures in the formations bearing heavy oil are generally not particularly high.

In the case of heavy oil, the aim is not to control the mobility of the drive fluid such as water by increasing its viscosity through polymer production, as has been proposed previously, particularly for the enhanced recovery of other types of oil, but to actually plug channels with a matrix of biomass and exopolymer. For such purpose substantially insoluble exopolymers are required.

Accordingly, the present invention provides a method of reducing in an oil-bearing underground formation the permeability of zones in the formation which have a higher permeability than surrounding zones. The method comprises:

(a) injecting into the underground formation microorganisms capable of producing exopolymer in the presence of a trigger compound and capable of growing under conditions of oil-bearing underground formations. The microorganisms, which are in an aqueous medium substantially free of said trigger compound, are injected such that they accumulate in the higher permeability zones.

(b) injecting the trigger compound into the underground formation so as to enhance production of exopolymer by the microorganisms, whereby the exopolymer reduces the permeability of the higher permeability zones.

The microorganisms which are used for injection according to the inventive method are grown under conditions of temperature, pH, $E_H$, salinity, etc. which are similar to the conditions generally found in oil-containing reservoirs. Accordingly, the microoganisms are obligate or facultative anaerobic strains which advantageously can withstand salinities of 6.5% and higher which is typical of the brine present in many oil reservoirs. Since the effect of pressure on microorganisms is generally minimal up to pressures of about 7,000 psi (50,500 kP), the pressure of most oil-bearing formations would not critically affect the performance of the present microorganisms.

Microorganisms which are preferred for use in the method according to the invention are bacterial strains which produce substantially insoluble exopolymer, the production of which is triggered by sucrose.

Leuconostoc species have been found to produce exopolymer the production of which is controlled by the availability of sucrose. In the following the use of these preferred bacterial strains in the inventive method is described. However, other microorganisms, the exopolymer production of which can be controlled and which are selected according to the criteria described above, may also be used in the inventive method.

As water is the drive fluid most commonly used, the following processes are generally described as applied in the enhanced recovery of oil using water. However, the inventive process may also be applied in the enhanced recovery of oil using drive fluids other than water.

As mentioned above the enhanced recovery of oil in which water is injected into one or more injection wells may lead to the formation of channels, so-called "thief" zones. Thus, the ratio of oil to water recovered in the production wells may decrease due to the fact that the water bypasses oil-bearing regions of lower permeability. In this case bacteria, generally a single substantially pure strain, selected as described above, are grown in a growth medium substantially free of sucrose, so that the bacteria produce practically no exopolymer, and under the conditions of the reservoir into which they are to be injected. Following this, the bacterial culture suspended in a substantially sucrose-free aqueous medium such as oil field brine, a nutrient-containing medium or the like is injected into the reservoir at or above formation pressure. It is advantageous to inject the bacterial culture while it is still in the stage of exponential growth.

Thus, during the injection process according to the invention the production of exopolymer by the bacteria is controlled by injecting the bacterial culture in a medium which supports growth of the bacteria without inducing exopolymer formation. In this way, plugging of the well bore can usually be avoided and the accumulation of the bacteria in the higher permeability zones of the oil-bearing formation can be effected as described in more detail hereinafter.

During the injection process according to the invention it must be taken care that (a) excessive shear forces or pressure differentials are avoided in order to preserve maximum viability of the bacterial culture; (b) at injection pressure the bacterial culture will not form gas bubbles to any considerable extent, since occurrence of such bubbles in the well bore generally leads to a considerable loss of injectivity; and (c) the bacterial cells will not form extensive chains, clumps or other aggregations, since these tend to lead to plugging of the well bore.

According to the invention the bacterial slurry is generally injected in the same way as the water used for flooding. In this way the bacteria enter predominantly higher permeability zones and channels developed during the water flooding process, since these are the areas of least resistance to the incoming slurry. Usually, relatively small quantities of the bacterial slurry disperse into other areas of the reservoir and, consequently, only small amounts of bacteria settle in those areas. It is generally advantageous to use bacteria which do not spontaneously adhere to the rock and/or sand surfaces of the reservoir. In this way the bacteria pass more easily into the channel areas.

The injection of the bacterial slurry may be followed by further injection of water or the injection of an aqueous medium containing nutrients to enhance in situ growth of the bacteria in the reservoir without inducing exopolymer production. In this way most of the bacterial slurry can be moved into the higher permeability zones of the formation.

In order to trace the movement of the bacterial slurry through the formation, the flow of water from the injection well to the production well is timed by the addition of tracers such as radioisotopes with short half lives, nitrates or other chemicals. In this manner the rate of travel of the bacterial slurry through the formation can be estimated.

Once the bacteria reach the zones which require plugging, sucrose in an aqueous medium is injected via the injection well through which the bacterial slurry was introduced previously. As soon as the sucrose solution, which may have a concentration of up to about 25%, preferably about 1% (w/v), reaches the bacteria in the formation, the bacteria start the production of exopolymer. The accumulation of exopolymer will reduce the permeability of the surrounding area. If sufficient sucrose is provided the exopolymer will accumulate to such an extent as to plug the areas of the formation in which the bacteria are located with a plug consisting of a matrix of bacterial cells and exopolymer.

Alternatively the sucrose solution may be injected via one or more of the production wells. In this case production of exopolymer will be limited to the region of overlap, i.e. to the area where the bacteria, which move into the formation from the injection well, and the sucrose solution, which moves into the formation from the production well, mix. The latter procedure may be of particular interest in cases when it is difficult to limit spread of the bacteria to the areas of high permeability.

In some cases it may be more efficient to introduce the bacterial slurry into the production well and then inject the sucrose solution either into the production well or into the injection well.

Well subsequent water flooding is resumed, the flow of injected water through the higher permeability zones is reduced or even blocked mainly due to the exopolymers produced in these zones, but partially also due to the increase in the number of bacterial cells. As a consequence the sweep efficiency of the water for surrounding oil-rich zones of lower permeability is increased and the amount of water coproduced with the oil at the production well is reduced. The "plugs" of exopolymer and bacterial cells withstand the pressures generally involved in water flooding.

Extracellular slime and/or biopolymers may be composed of polysaccharides and/or protein. The exopolymers formed by the bacteria which are preferred for use in the method according to the invention comprise polymeric derivatives of sucrose which contain glucose and/or fructose as major constituent.

According to the invention the microorganisms may be selected for use in reservoirs with temperatures of between about 10° and 70° C., salinities of up to 9%, a pH of between 3 and 9 and pressures of up to 7,000 psi.

Provided that the microorganism culture is put into place in the reservoir in an aqueous system and the trigger compound is accessible to the microorganisms in the formation in an aqueous solution, a drive fluid other than water may be used for the enhanced recovery of the oil. Thus, sucrose, which is the compound controlling the exopolymer formation of the preferred bacterial strains, may be introduced into the formation in a non-aqueous medium as long as the sucrose is ultimately available to the bacterial culture in aqueous solution. Supercritical gas, particularly, supercritical carbon dioxide which generally is a good solvent may be used for this purpose.

Examples of drive fluids suitable in connection with the method of the present invention are, besides water, aqueous systems such as microemulsions of water in hydrocarbons or hydrocarbons in water, micellar suspensions and the like as well as certain gases.

The inventive method of reducing the permeability of zones which have a relatively high permeability by controlled introduction and growth of exopolymer producing microorganisms into such zones may also be applied to selectively plug undesirable fractures in a geological formation. As fractures constitute areas of high permeability, sealing of fractures often becomes necessary when drive fluid moving into such fractures forms channels or when such fractures connect the oil-bearing formation with a water-bearing formation such as an active aquifer allowing undesired water to enter into the production zone.

EXAMPLE 1

Isolation and Identification of Bacterial Strains

From sources such as garden compost, contaminated Clostridium cultures and an open oil pit sump several strains of bacteria were selected and screened by known methods, for their ability to produce an exopolymer in the presence of sucrose, and to grow under conditions similar to the conditions of the Golden Lake oil field at Lloydminster, Alberta, i.e. at a temperature of between about 10° and 38°0 C., a salinity of up to about 6.5%, and a pH of between 3 and 8, anaerobically, and in the presence of heavy oil.

Five bacterial strains having the above-mentioned properties were isolated. These strains are listed in Table 1.

Standard tests have shown that all five of these strains are Gram-positive cocci. Though the identification of the strains has not yet been completed, it is believed that the five strains can be assigned to one of the following families of bacteria: Micrococcaceae, Streptococcaceae or Peptococcaceae.

Known identification procedures showed that strain 18-1 is a facultative anaerobic, catalase-negative, Gram-positive coccus capable of producing in the presence of sucrose a glucose based exopolymer. Tentatively this strain is assigned as a Leuconostoc species of the Streptococcaceae family.

During the procedures for isolating the five bacteria strains listed in Table 1 a number of exopolymer forming Gram-positive rods were discovered. These rods may belong to the Bacillaceae or Lactobacillaceae families.

TABLE 1

| Exopolymer Producing Bacteria | |
|---|---|
| Source | Bacterial Strains |
| Garden Compost | 18-1 |
| Contaminants of Clostridium cultures | 824-1 |
| | 8529-1 |
| | 527-3A |
| Open oil pit sump | 5-1 |

EXAMPLE 2

Control of Exopolymer Formation

To determine whether the exopolymer formation of each of the five strains listed in Table 1 was controllable by altering the composition of the growth medium, the following experiment was performed.

The five bacterial strains that produce exopolymer on solid 2% agar media were grown anaerobically at 35° C. in a liquid medium of the composition shown in Table 2 containing 1.0% sucrose or 0.5% fructose and 0.5% glucose. The bacteria were grown to a final cell concentration of $3 \times 10^8$/mL.

The amount of carbohydrate based exopolymers produced was determined by a modification of the procedure of Ingelman and Halling (B. Ingelman and M. S. Halling: "Some physico-chemical studies on fractions of dextran", Ark. Hemi. 1:61–80, 1949). Liquid culture (3.0 mL) was centrifuged at 17,000×g at 0° C. for thirty minutes to remove bacterial cells. The supernatant (3.0 mL) was added to absolute ethanol (11.0 mL) mixed thoroughly and placed in a −2° C. freezer for one hour. The chilled solution was then centrifuged again at 17,000×g at 0° C. for thirty minutes and the supernatant discarded. The pellet (precipitated protein and carbohydrate based polymers) was resuspended in distilled water (3.0 mL) and assayed for reducing sugars using standard techniques such as described in M. Dubois, K. A. Gilles, J. K. Hamilton, D. A. Rebers, and F. Smith: "Colorimetric method for determination of sugars and related substances". Anal. chem. 28: 350–356, 1956. The amount of biopolymer was calculated by the difference in the amount of reducing sugar found in the sample relative to a control consisting of uninoculated medium.

The results of this screening are shown in Table 3. All the bacterial strains tested showed some control of exopolymer formation depending on which sugar(s) was used for growth. In particular two bacterial strains, 18-1 and 824-1, showed very large reductions in exopolymer formation by shifting from growth on sucrose to growth on glucose and fructose. Accordingly, the exopolymer production of the 18-1 and 824-1 strains is controllable to a large extent by the addition or deletion of sucrose.

Tests with the rod bacteria of Example 1 showed generally less satisfactory exopolymer control.

TABLE 2

| Liquid Growth Medium |
|---|
| The medium is based on synthetic brine made according to the analyzed chemical composition of the co-produced brine received from the Golden Lake oil field in Lloydminster, A5-14-48-23W3, June 10, 1981. |

| Synthetic Brine: | |
|---|---|
| NaCl | 56.42 g |
| NaF | 0.04 g |
| $KNO_3$ | 0.19 g |
| $CaCl_2.2H_2O$ | 1.15 g |
| $MgCl_2.6H_2O$ | 5.55 g |

TABLE 2-continued

Liquid Growth Medium

The medium is based on synthetic brine made according to the analyzed chemical composition of the co-produced brine received from the Golden Lake oil field in Lloydminster, A5-14-48-23W3, June 10, 1981.

| | |
|---|---|
| $BaCl_2.2H_2O$ | 0.10 g |
| Distilled water to 1 liter | |
| Growth Medium (ingredients per liter)* | |
| $K_2HPO_4$ | 0.7 g |
| $KH_2PO_4$ | 0.3 g |
| $(NH_4)_2SO_4$ | 1.0 g |
| $FeSO_4$ | 0.005 g |
| $ZnSO_4$ | 0.002 g |
| $MnSO_4$ | 0.005 g |
| $CoCl_2$ | 0.001 g |
| $(NH_4)_6Mo_7O_{24}.4H_2O$ | 0.001 g |
| $Na_2B_4O_7$ | 0.0011 g |
| $CdSO_4$ | 0.001 g |
| $CuSO_4$ | 0.0007 g |
| Yeast extract | 0.02 g |
| Cysteine HCl | 0.25 g |
| Nutrient broth | 16.0 g |
| Brain Heart Infusion | 3.0 g |
| Synthetic brine (above) | 500 mL |
| Distilled water | 500 mL |

TABLE 3

Exopolymer Formation

| Bacterial strain | Exopolymer Formed | (mg/mL culture) |
|---|---|---|
| | Growth Medium +1% (w/v) Sucrose | Growth Medium +0.5% (w/v) Glucose +0.5% (w/v) Fructose |
| 18-1 | 2.20 | 0.25 |
| 824-1 | 2.00 | 0.25 |
| 8529-1 | 2.10 | 0.90 |
| 527-3A | 2.00 | 1.90 |
| 5-1 | 3.40 | 1.0 |

DESCRIPTION OF THE MODEL CORE SYSTEM

In the following

(i) Model Core Preparation

Glass bead cores were produces to provide a continuous porous medium for plugging studies by the method of Shaw (Shaw (Chin), Jerry, M.Sc. Thesis, 1982. University of Calgary, Calgary Alberta). Random packing of uniform Blast-O-Lite Industrial glass beads (90 μm) (trademark of Flexolite of Canada Ltd.) was achieved by pouring glass beads into pyrex vials (internal diameter 1 cm) to a depth of 5.0 cm under agitation by an ultrasonic vibrator (Bransonic). The beads were then fused by incubation at 700° C. for 150 minutes and allowed to cool overnight. The solid core was liberated from the glass vial by shattering the vial.

The average throat size of the pore system was 16 μm and average porosity was 36% which gives an average pore volume per core of 1.5 $cm^3$ (Shaw, supra). Permeability was usually about 6 Darcies (Shaw, supra).

The cores were sterilized with ethylene oxide immediately prior to use. After sterilization, the core was degassed and flooded with the test medium as follows. The core was balanced over a beaker of sterile test fluid in a bell jar, and degassed under vacuum (less than 100μ) for at least 30 minutes. The core was then tipped into the test fluid and allowed to sit under vacuum for 5 minutes. The vacuum was released and the core stored in the test fluid until inserted in the core holder as described below.

(ii) Apparatus

Figure 1:
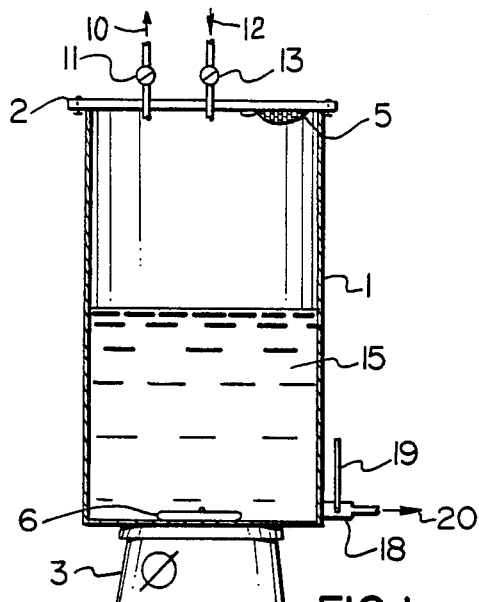
FIG. 1 is a diagrammatic view of a preferred embodiment of an anaerobic reservoir for core plugging studies according to the invention.

The complete model core study apparatus consisted of an anaerobic reservoir modified from the system of J. Shaw (FIG. 1), a core holder assembly (FIG. 2), and a volumetric collection vessel (not shown). The body of the anaerobic reservoir 1 was made from 25 cm internal diameter PVC (1 cm thick) and supplied with a magnetic stirrer 3. The top 2 was removable and formed a pressure seal with the body by way of a rubber O-ring. The reservoir for bacterial cultures (FIG. 1) was connected to the stainless steel core holder (FIG. 2) by tygon tubing during the run.

(iii) Apparatus Assembly and Operation

Figure 2:
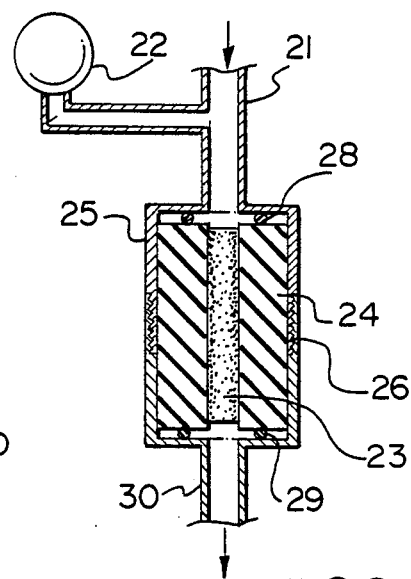
FIG. 2 is a diagrammatic view of a core holder for core plugging studies.

The reservoir 1 (FIG. 1) was sterilized with 70% ethanol while the rest of the equipment was sterilized with ethylene oxide. The reservoir was fitted with sterile palladium catalyst 5 and a stirring bar 6, then sealed. The reservoir was then alternately evacuated via line 10 and valve 11, flushed several times via line 12 and valve 13 with oxygen-free mixed gas of 90% $N_2$, 5% $CO_2$, 5% $H_2$ (Medigas) and left evacuated (15 inches Hg). The appropriate bacterial culture 15 was then sucked into the reservoir through the exit port 18 which was supplied with a thermometer 19. The unit was repressurized with mixed gas after pinching off the tygon tubing attached to the exit port. A tube filled with Lucas semi-solid anaerobic indicator (A. T. Willis: "Techniques for the study of anaerobic spore-forming bacteria". Pages 80–115 in Methods in Microbiology. J. R. Norris and D. W. Ribbons, ed's. Volume 3B, Academic Press, New York, 1969) was attached to one of the entry ports on the top of the unit to monitor for oxygen contamination of the reservoir. The prepared core was removed from its beaker of test fluid, wrapped in sterile teflon tape, and coated with sterile vacuum grease. The thus prepared core 23 (FIG. 2) was placed in a rubber sleeve 24. The core and sleeve together were then placed in the sterilized stainless steel core holder 25. The two parts of the core holder 25 were joined together at 26 so that seals were established by way of rubber O-rings 28, 29. Following this the core was filled with test fluid from the reservoir by a length of tygon tubing connecting line 20 (FIG. 1) with line 21 (FIG. 2). Line 21 was provided with a pressure gauge 22. Line 30 connected the core with a collection vessel (not shown).

The total unit was placed under a positive pressure of mixed gas (3.5 psi) and the run commenced at room temperature. Pressure, temperature and flow rates were monitored throughout the run. Viscosities of the test fluids were determined at ambient temperature by a Canon-Fenske viscometer. Permeabilities were determined according to Darcy's Law.

Figure 3:
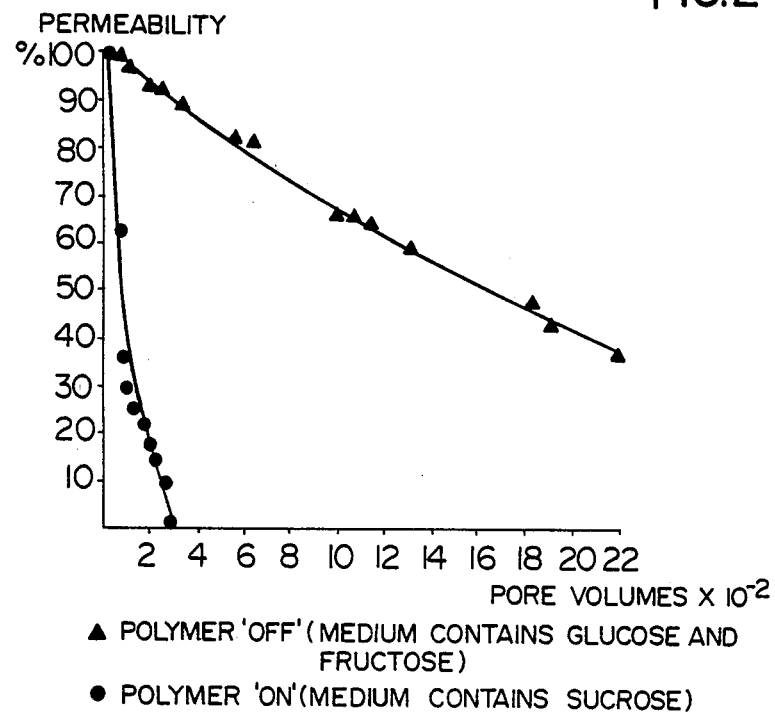
FIG. 3 is a diagram showing the relation between permeability and pore volume in a test core treated according to the invention.

Data was plotted as % reduction in initial permeability versus pore volumes of test fluid passed through the core (FIG. 3).

EXAMPLE 3

Bacterial strain 18-1, which is capable of growing under aerobic and anaerobic conditions, was grown anaerobically at between 28° and 35° C. in a Forma Scientific anaerobic work station model 1024 in a liquid medium of the composition shown in Table 2 containing either 1.0% sucrose (medium that supports exopolymer formation: polymer "on") or 0.5% fructose and 0.5% glucose (medium that inhibits exopolymer formation: polymer "off"). The initial pH of the bacterial culture was near neutral. The culture was maintained at $E_H$ values of between avout $-51$ and $-420$ mV, since the resazurin based indicator used to detect oxygen leaks in the anaerobic reservoir responded to $E_H \sim -51$ mV and the reservoir catalyst operates at an $E_H$ of $-420$ mV. The bacterium was grown to a final cell concentration of $3 \times 10^8$/mL. The bacterial suspensions were passed at room temperature separately through the model glass bead core described above and the permeability of the core was measured over time. The pressure drop over a distance of 5 cm amounted to 3.5 psi. The results which are shown in FIG. 3 indicate that the strain, when grown in liquid medium containing sucrose and therefore producing large amounts of exopolymer, reduces the permeability of the core drastically on injection, even though its viscosity was below 5 Cp, while the strain, when grown in liquid medium containing fructose and glucose and therefore producing little exopolymer, reduces core permeability much less on injection.

EXAMPLE 4

Bacterial strain 18-1 was grown anaerobically in a liquid medium of the composition shown in Table 2 containing 0.5% fructose and 0.5% glucose (medium that inhibits exopolymer formation). The bacterium was grown to a final cell concentration of $3 \times 10^8$/mL under the conditions set out in Example 3. Five pore volumes of this bacterial suspension were run through the model glass bead core described above and the initial permeability was measured. The core was then removed from the apparatus in an aseptic manner and placed in a sterile dialysis bag, having an exclusion limit of 9,000 Daltons, in a flask containing 2 L of the liquid medium of Table 2 containing 1.0% sucrose (medium that will stimulate exopolymer formation). The assembly was incubated anaerobically at 35° C. for 72 hours. After incubation the core was removed and was observed to be impregnated with exopolymer. Its permeability was measured in the core apparatus as described above using growth medium as the test fluid. Core permeability, measured at a pressure drop of 0.7 psi/cm, was found to be reduced by 89%, from 7.4 Darcies to 0.81 Darcies, by the in situ exopolymer formation and growth of the bacteria demonstrating that production of exopolymer in situ can effectively reduce the permeability of the core.

The embodiments of the invention in which an exclusive property or privilege is claimed are defined as follows:

1. In the enhanced recovery of mineral oil by supplying a drive fluid to an oil-bearing underground formation, a method of reducing permeability of zones in the formation having higher permeability than surrounding zones comprising:
   (a) injecting into the underground formation microorganisms capable of producing substantially insoluble exopolymer in the presence of a trigger compound and capable of growing under conditions of oil-bearing underground formations, such that said microorganisms accumulate in said higher permeability zones, said microorganisms being injected in an aqueous medium substantially free of said trigger compound; and
   (b) injecting the trigger compound into the underground formation so as to enhance production of substantially insoluble exopolymer by said microorganisms, whereby the exopolymer reduces the permeability of said higher permeability zones.

2. A method as in claim 1 wherein the microorganisms supplied to the underground formation are grown and maintained in an aqueous growth medium substantially free of said trigger compound prior to their injection into the underground formation.

3. In the enhanced recovery of mineral oil by supplying a drive fluid to an oil-bearing underground formation, a method of reducing permeability of zones in the formation having higher permeability than surrounding zones comprising:
   (a) growing and maintaining microorganisms, which in the presence of a trigger compound are capable of producing substantially insoluble exopolymer and in the absence of said trigger compound substantially stop producing exopolymer and which are capable of growing under conditions of oil-bearing underground formations, in an aqueous growth medium which is substantially free of said trigger compound;
   (b) injecting said microorganisms into the underground formation in an aqueous medium substantially free of said trigger compound;
   (c) injecting into the underground formation drive fluid substantially free of said trigger compound so as to cause said microorganisms to accumulate in said higher permeability zones; and
   (d) injecting said trigger compound into the underground formation so as to trigger production of substantially insoluble exopolymer by said microorganisms, whereby the amount of exopolymer produced controls the permeability of said higher permeability zones.

4. A method as in claim 1, 2 or 3 wherein the drive fluid is selected from the group consisting of water, aqueous solutions, microemulsions and micellar suspensions based on water and hydrocarbons, and drive gases.

5. A method as in claim 1, 2 or 3 wherein the drive fluid is water.

6. A method as in claim 1, 2 or 3 wherein the microorganisms are bacterial strains the exopolymer production of which is triggered by sucrose.

7. In the enhanced recovery of mineral oil from an oil-bearing underground formation penetrated by spaced injection and production wells by introducing into said formation a drive fluid via said injection well, a method of reducing permeability of zones in the formation having higher permeability than surrounding zones comprising:
   (a) introducing via said injection well into the underground formation microorganisms, capable of producing substantially insoluble exopolymer in the presence of a trigger compound and capable of growing under conditions of oil-bearing underground formations, such that said microorganisms accumulate in said higher permeability zones, said microorganisms being introduced into the underground formation in an aqueous medium substantially free of said trigger compound; and
   (b) introducing via said production well into the underground formation the trigger compound so that the trigger compound reaches the microorganisms in the underground formation and triggers production of substantially insoluble exopolymer by said microorganisms, said exopolymer reducing the permeability of said higher permeability zones.

8. A method as in claim 7 wherein the trigger compound is introduced into the underground formation via said injection well.

9. A method as in claim 7 wherein the microorganisms are bacterial strains the exopolymer production of which is triggered by sucrose.

10. In the enhanced recovery of mineral oil by supplying a drive fluid to an oil-bearing underground formation, a method of reducing permeability of zones in the formation having higher permeability than surrounding zones comprising:
 (a) injecting into the underground formation in a substantially sucrose-free aqueous medium bacteria capable of producing substantially insoluble exopolymer in the presence of sucrose and capable of growing under conditions of oil-bearing underground formations, such that said bacteria accumulate in said higher permeability zones; and
 (b) injecting sucrose in an aqueous medium into the underground formation so as to enhance production of substantially insoluble exopolymer by said bacteria, whereby the exopolymer reduces the permeability of said higher permeability zones.

11. A method as in claim 10 wherein the bacteria supplied to the underground formation are grown and maintained in an aqueous substantially sucrose-free growth medium prior to their injection into the underground formation.

12. In the enhanced recovery of mineral oil by supplying a drive fluid to an oil-bearing underground formation, a method of reducing permeability of zones in the formation having higher permeability than surrounding zones, comprising:
 (a) growing and maintaining in an aqueous substantially sucrose-free growth medium bacteria which in the presence of sucrose are capable of producing substantially insoluble exopolymer and in the absence of sucrose substantially stop producing exopolymer and which are capable of growing under conditions of oil-bearing underground formations;
 (b) injecting said bacteria in a substantially sucrose-free aqueous medium into the underground formation;
 (c) injecting a substantially sucrose-free aqueous medium into the underground formation so as to cause said bacteria to accumulate in said higher permeability zones; and
 (d) injecting sucrose in an aqueous medium into the underground formation so as to trigger production of substantially insoluble exopolymer by said bacteria, whereby the amount of exopolymer produced controls the permeability of said higher permeability zones.

13. A method as in claim 10, 11 or 12 wherein the drive fluid is selected from the group consisting of water, aqueous solutions, microemulsions and micellar suspensions based on water and hydrocarbons, and drive gases.

14. A method as in claim 12 wherein the drive fluid is water.

15. In the enhanced recovery of mineral oil from an oil-bearing underground formation penetrated by spaced injection and production wells by introducing into said formation a drive fluid via said injection well, a method of reducing permeability of zones in the formation having higher permeability than surrounding zones comprising:
 (a) introducing via said injection well into the underground formation in a substantially sucrose-free aqueous growth medium bacteria capable of being triggered by sucrose to produce substantially insoluble exopolymer and capable of growing under conditions of oil-bearing underground formations, such that said bacteria accumulate in said higher permeability zones; and
 (b) introducing via said production well sucrose in an aqueous medium into the underground formation so that the sucrose reaches the bacteria in the underground formation and triggers production of substantially insoluble exopolymer by said bacteria, said exopolymer reducing the permeability of said higher permeability zones.

16. A method as in claim 15 wherein the sucrose is introduced into the underground formation via said injection well.

17. A method as in claim 15 or 16 wherein the drive fluid is selected from the group consisting of water, aqueous solutions, microemulsions and micellar suspensions based on water and hydrocarbons, and drive gases.

* * * * *